United States Patent
Punj et al.

(10) Patent No.: US 8,634,530 B2
(45) Date of Patent: Jan. 21, 2014

(54) AUDIO MIXER AND METHOD

(75) Inventors: Arun Punj, Cranberry Township, PA (US); Peter D. Hill, Monroeville, PA (US); Richard E. Huber, Harmony, PA (US)

(73) Assignee: Ericsson AB, Stockholm (SE)

( * ) Notice: Subject to any disclaimer, the term of this patent is extended or adjusted under 35 U.S.C. 154(b) by 257 days.

(21) Appl. No.: 12/958,793

(22) Filed: Dec. 2, 2010

(65) Prior Publication Data

US 2011/0075669 A1  Mar. 31, 2011

Related U.S. Application Data

(62) Division of application No. 10/871,852, filed on Jun. 17, 2004, now abandoned.

(60) Provisional application No. 60/483,137, filed on Jun. 27, 2003.

(51) Int. Cl.
*H04M 3/42* (2006.01)

(52) U.S. Cl.
USPC ...... 379/202.01; 709/204; 709/227; 370/260; 370/262; 381/119

(58) Field of Classification Search
USPC .......... 709/204, 227; 370/260, 262, 352, 353; 379/202.01; 381/119
See application file for complete search history.

(56) References Cited

U.S. PATENT DOCUMENTS

| | | | |
|---|---|---|---|
| 5,778,181 A | 7/1998 | Hidary et al. | |
| 5,961,603 A | 10/1999 | Kunkel et al. | |
| 6,006,253 A * | 12/1999 | Kumar et al. | 709/204 |
| 6,125,343 A * | 9/2000 | Schuster | 704/201 |
| 2003/0058805 A1 | 3/2003 | Meyerson et al. | |
| 2003/0058836 A1 | 3/2003 | Even | |

FOREIGN PATENT DOCUMENTS

| | | |
|---|---|---|
| EP | 0 915 621 A2 | 5/1999 |
| JP | 08-088843 A | 2/1996 |
| JP | 2001-036528 A | 2/2001 |
| JP | 2002-252839 | 6/2002 |
| JP | 2003-069563 A | 3/2003 |

OTHER PUBLICATIONS

Handley, M. et al. RFC 2543: SIP: Session in Initiation Protocol. Internet, URL: www.ietf.org. Mar. 1999.

* cited by examiner

*Primary Examiner* — Simon Sing

(57) ABSTRACT

A telecommunications system includes a first node having audio and video streams. The system includes a second node having only an audio stream. The system includes a mechanism for forming a call between the first node and the second node so the first node and the second node communicate their audio streams with each other. The forming mechanism is in communication with the first and second nodes. Preferably, a third node can communicate with the first and second nodes through the forming means. A method for forming a telecommunications call including the steps of calling from a first node having audio and video streams a second node having only an audio stream. There is the step of forming a call between the first node and the second node so the first node and the second node communicate their audio streams with each other.

6 Claims, 3 Drawing Sheets

AUDIO MIXER AND METHOD

CLAIMING BENEFIT OF PRIOR FILED U.S. APPLICATIONS

This application is a divisional application of U.S. patent application Ser. No. 10/871,852, filed Jun. 17, 2004, now abandoned, which claimed the benefit of U.S. Provisional Application Ser. No. 60/483,137, filed on Jun. 27, 2003. The contents of these documents are hereby incorporated by reference herein.

RELATED U.S. APPLICATION

This application is related to contemporaneously filed U.S. provisional patent application Ser. No. 60/483,217 titled "Gateway and Method", by Rich Newpol, Arun Punj, Richard E. Huber and Brian Rosen, now U.S. patent application Ser. No. 10/871,726, incorporated by reference herein.

FIELD OF THE INVENTION

The present invention is related to a telecommunications call between one or more terminals having audio and video streams and one or more terminals having only audio streams. More specifically, the present invention is related to a telecommunications call between one or more terminals having audio and video streams and one or more terminals having only audio streams with a mixer.

BACKGROUND OF THE INVENTION

Prior Art Products Information
Network Phones

Networks such as IP/Ethernet, T1 and ISDN can connect telephony terminals to one another. Voice and video data streams are carried on these networks per their respective protocols. Telephony devices such as SIP phones are network based equivalents to the conventional telephone. Telephony Gateways provide an interface between phones on a local data network such as a local area network (LAN) and a conventional telephony network such as analog phone lines, digital telephone interfaces such as T1 and ISDN commonly found in the PBX.
Mediatrics PSTN Gateway This device provides a SIP to PSTN interface. It terminates a SIP call on Ethernet IP side and relays it on PSTN side.
Intel Audio PBX Gateway This device provides a SIP to PBX interface. It terminates a SIP call on Ethernet IP side and relays it on PBX side.
AudioCodes PRI Gateway This device provides a SIP to PBX interface. It terminates a SIP call on Ethernet IP side and relays it on PBX side.
CISCO SIP Phone
Pingtel Xpressa SIP Phone These phones are connected to an Ethernet network instead of dedicated telephone lines. They send and receive a single audio data stream and require a media conferencing unit (MCU) to connect 3 or more telephones into the same call.
H.320/H323 Phones These devices use the H.320/H.323 protocol instead of the SIP protocol to establish connections. They also require the use of an MCU to conference 3 or more phones.
Present Invention The conventional phone terminals connect to a central processing device that receives the audio and video streams from the terminals, mixes the audio and formats the incoming video. The results are sent back to the terminal for display and playback.

The ViPr™ system differentiates itself from other conferencing systems in that in a conference call of 3 or more terminals each terminal sends audio and video data to the other terminals using multicast IP or point-to-multipoint (PMP) ATM and each terminal receives the audio and video data streams from each of the other terminals and processes them accordingly. The incoming audio streams were encoded using standardized algorithms by the transmitting terminals. The terminals receiving these audio streams decode and add the incoming audio streams. The blended audio stream is played out of a speaker system for the user to hear.

The distributed video and audio processing that ViPr uses is incompatible with the MCU architecture that the SIP phones and H devices use. In order to interface to these devices, a means and apparatus called the Unicast Audio Mixer (UAM) was developed.

ViPr terminals communicate to the UAM as if it was another ViPr terminal without video. The unicast devices such as SIP phones communicate with the UAM as if it was another SIP phone. This function of presenting one interface to the ViPr terminals and another to the unicast devices is called a back-to-back user agent (B2BUA). The UAM is the only device that can implement a B2BUA between ViPr terminals and unicast devices.

The UAM handles a large number of simultaneous conferences involving one or more unicast devices and one or more ViPr terminals.

Another feature of the UAM is to act as a bridge between two different networks. For example, if all the ViPr terminals are on an ATM network and the unicast devices are on an Ethernet network then the UAM would be configured with one ATM NIC and one Ethernet NIC. Along with the SIP signaling and audio processing, the UAM would bridge these two networks.

In order to support this functionality, the ViPr system includes a UAM that adds seamless conferencing functionality between the ViPr terminals and telephone users (i.e. PSTN, Mobile phones and SIP phones) by converting an upstream unicast telephone audio stream to point-to-multipoint audio streams (i.e. PMP-SVC or IP Multicast) and mixing/converting downstream PMP/multicast ViPr audio streams to unicast telephone audio streams as well as performing downstream audio transcoding of ViPr audio from the wideband 16 bit/16 KHz PCM encoding to G.711 or G.722.

An additional functionality provided by the UAM is that of an Intermedia gateway that converts IP/UDP audio streams to ATM SVC audio streams and vice-versa. This functionality enables the interoperability between ViPr systems deployed in ATM environments and SIP-based Voice-over-IP (VoIP) telephony gateways on Ethernet networks.

The current ViPr system provides support for telephony systems through SIP-based analog and digital telephony gateways. This functionality enables ViPr users to make/receive point-to-point calls to/from telephone users. However, they do not allow a ViPr user to add a telephone call to a ViPr conference. This is due to the unicast nature of telephone calls and the inability of the telephony gateways to convert them to PMP/multicast streams. The ViPr UAM will enhance the ViPr system's support for telephony by enabling ViPr users to add unicast telephone calls to ViPr conferences.

The UAM adds conferencing capabilities between the ViPr terminals and telephone users (i.e. PSTN, Mobile phones and SIP phones) by converting upstream unicast voice-only telephone streams into point-to-multipoint streams (i.e. PMP-SVC or IP Multicast) and converting downstream ViPr multicast/PMP audio streams to unicast telephone voice-only streams as well as performing downstream audio transcoding of ViPr audio from wideband 16 bit/16 KHz PCM encoding to G.711 or G.722.

The UAM is designed to:
a. Enable point-to-point voice-only calls between one ViPr user and one telephone user.
b. Enable adding one voice-only telephone call to a multiparty ViPr audio/video conference.
c. Perform downstream audio transcoding of ViPr audio streams from the wideband 16 bit/16 KHz PCM to G.711 or G.722.
d. Operate as an Intermedia gateway bridging between ViPr terminals on an ATM network and SIP-based VoIP telephony gateways on Ethernet networks.

SUMMARY OF THE INVENTION

The present invention pertains to a telecommunications system. The system comprises a first node having audio and video streams. The system comprises a second node having only an audio stream. The system comprises means for forming a call between the first node and the second node so the first node and the second node communicate their audio streams with each other. The forming means is in communication with the first and second nodes.

The present invention pertains to a method for forming a telecommunications call. The method comprises the steps of calling from a first node having audio and video streams a second node having only an audio stream. There is the step of forming a call between the first node and the second node so the first node and the second node communicate their audio streams with each other.

The present invention pertains to a telecommunications system. The system comprises a first network having a first media type in which audio streams are transmitted. The system comprises a second network having the first media type in which audio streams are transmitted. The system comprises a third network having a second media type different from the first media type in which audio streams are transmitted. The system comprises a mixer which bridges audio streams between the first, second and third networks.

The present invention pertains to a telecommunications system. The system comprises a first network having a first media type in which signals are transmitted. The system comprises a second network having the first media type in which signals are transmitted. The system comprises a third network having a second media type different from the first media type in which signals are transmitted. The system comprises a mixer which bridges signals between the first, second and third networks.

The present invention pertains to a telecommunications system. The system comprises a plurality of audio terminals which produce audio streams. The system comprises a plurality of audio and video terminals which produce audio and video streams. The system comprises a mixer which receives an audio stream from each audio stream and transmits the audio stream to the audio and video terminals. The system comprises a network in which the audio terminals, the audio and video terminals and the mixer are in communication to communicate with each other.

The present invention pertains to a method for creating a conference call between at least two nodes where at least a first node of the two nodes is a first audio/video terminal and at least a second node of the two nodes is a first audio terminal. The method comprises the steps of calling the first audio terminal from the first audio/video terminal. There is the step of routing the audio streams from both terminals to a mixer. There is the step of adding at least a second audio/video terminal as a conference participant by routing its audio stream to the mixer and to the first audio/video terminal. There is the step of adding at least a second audio terminal as a conference participant by routing its audio stream to the mixer. There is the step of sending a mixed audio stream to each audio terminal by mixing audio streams from all the terminals except the audio stream of the terminal receiving the mixed audio stream.

The present invention pertains to a telecommunications system. The system comprises a first audio terminal having a first format in which audio streams are transmitted from the first audio terminal. The system comprises a second audio terminal having a second format in which audio streams are transmitted from the second audio terminal. The system comprises a third audio terminal having a third format in which audio streams are transmitted from the third audio terminal. The system comprises a mixer which translates respective audio streams from the first, second and third terminals into a respective format so they can be understood by the first, second and third terminals when they receive them. The system comprises a network through which the first, second and third terminals communicate their respective audio streams with each other.

BRIEF DESCRIPTION OF THE DRAWINGS

In the accompanying drawings, the preferred embodiment of the invention and preferred methods of practicing the invention are illustrated in which.

DETAILED DESCRIPTION

Figure 4:
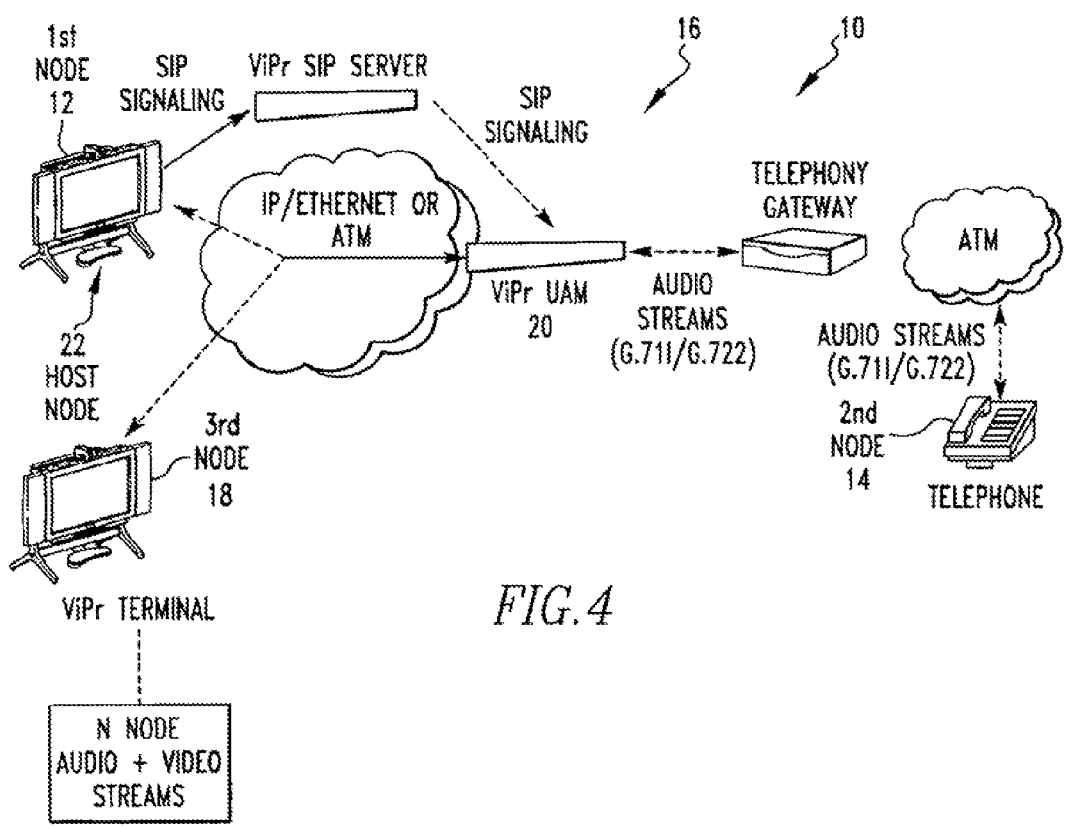
FIG. 4 is a schematic representation of a videophone UAM in a video phone conference.

Referring now to the drawings wherein like reference numerals refer to similar or identical parts throughout the several views, and more specifically to FIG. 4 thereof, there is shown a telecommunications system 10. The system 10 comprises a first node 12 having audio and video streams. The system 10 comprises a second node 14 having only an audio stream. The system 10 comprises means 16 for forming a call between the first node 12 and the second node 14 so the first node 12 and the second node 14 communicate their audio streams with each other. The forming means 16 is in communication with the first and second nodes 12, 14.

Preferably, the system 10 includes a third node 18 having an audio stream and a video stream, and wherein the forming means 16 includes a mixer 20 which connects a conference between the first, second and third nodes 12, 14, 18, respectively, so the first, second and third nodes 12, 14, 18, communicate their audio streams with each other. The system 10 preferably includes a host node 22 and wherein the mixer 20 communicates with the host node 22 to host the conference. Preferably, the mixer 20 terminates a first connection of the call between the first node 12 and the mixer 20 and creates a second connection of the call between the mixer 20 and the second node 14 in which data from the first connection is sent from the mixer 20 to the second node 14.

The system 10 preferably includes a fourth node having only an audio stream, a first network in which the first, second and third nodes 12, 14, 18 are disposed, and a second network different from the first network in which the fourth node is disposed, and the mixer 20 bridges audio streams between the fourth node of the second network and the first, second and third nodes 12, 14, 18 of the first network.

The present invention pertains to a method for forming a telecommunications call. The method comprises the steps of calling from a first node 12 having audio and video streams a second node 14 having only an audio stream. There is the step of forming a call between the first node 12 and the second node 14 so the first node 12 and the second node 14 communicate their audio streams with each other.

Preferably, there is the step of adding a third node 18 having an audio stream and a video stream to the call to form a conference between the first, second and third nodes 12, 14, 18, respectively, so the first and third nodes 12, 18 communicate their audio and video streams with each other, and the first, second and third nodes 12, 14, 18 communicate their audio streams with each other. The step of adding a third node 18 preferably includes the step of communicating with a host node 22 to host the conference. The forming step preferably includes the step of terminating a first connection of the call between the first node 12 and a mixer 20 and creating a second connection of the call between the mixer 20 and the second node 14 in which data from the first connection is sent from the mixer 20 to the second node 14.

The mixer 20 comprises a computer having at least one Network Interface Card (NIC), and preferably 2 or more NICs, with ideally one NIC for each distinct network that the mixer 20 communicates with, and for instance a line card to communicate with a node having only an audio stream, such as a PSTN line, PBX line or PRI line.

A description of a system and method involving nodes having video and audio streams, otherwise known as ViPrs is found in PCT application PCT/IB03/01468 claiming priority from U.S. application Ser. No. 10/114,402, incorporated by reference herein.

The present invention pertains to a telecommunications system 10. The system 10 comprises a first network having a first media type in which audio streams are transmitted. The system 10 comprises a second network having the first media type in which audio streams are transmitted. The system 10 comprises a third network having a second media type different from the first media type in which audio streams are transmitted. The system 10 comprises a mixer 20 which bridges audio streams between the first, second and third networks.

The present invention pertains to a telecommunications system 10. The system 10 comprises a first network having a first media type in which signals are transmitted. The system 10 comprises a second network having the first media type in which signals are transmitted. The system 10 comprises a third network having a second media type different from the first media type in which signals are transmitted. The system 10 comprises a mixer 20 which bridges signals between the first, second and third networks.

The present invention pertains to a telecommunications system 10. The system 10 comprises a plurality of audio terminals which produce audio streams. The system 10 comprises a plurality of audio and video terminals which produce audio and video streams. The system 10 comprises a mixer 20 which receives an audio stream from each audio stream and transmits the audio stream to the audio and video terminals. The system 10 comprises a network in which the audio terminals, the audio and video terminals and the mixer 20 are in communication to communicate with each other.

The present invention pertains to a method for creating a conference call between at least two nodes where at least a first node 12 of the two nodes is a first audio/video terminal and at least a second node 14 of the two nodes is a first audio terminal. The method comprises the steps of calling the first audio terminal from the first audio/video terminal. There is the step of routing the audio streams from both terminals to a mixer 20. There is the step of adding at least a second audio/video terminal as a conference participant by routing its audio stream to the mixer 20 and to the first audio/video terminal. There is the step of adding at least a second audio terminal as a conference participant by routing its audio stream to the mixer 20. There is the step of sending a mixed audio stream to each audio terminal by mixing audio streams from all the terminals except the audio stream of the terminal receiving the mixed audio stream.

The present invention pertains to a telecommunications system 10. The system 10 comprises a first audio terminal having a first format in which audio streams are transmitted from the first audio terminal. The system 10 comprises a second audio terminal having a second format in which audio streams are transmitted from the second audio terminal. The system 10 comprises a third audio terminal having a third format in which audio streams are transmitted from the third audio terminal. The system 10 comprises a mixer 20 which translates respective audio streams from the first, second and third terminals into a respective format so they can be understood by the first, second and third terminals when they receive them. The system 10 comprises a network through which the first, second and third terminals communicate their respective audio streams with each other.

In the operation of the invention, a first node 12 which can produce an audio stream and a video strewn, and which is part of an ATM network having quality of service capability, wishes to form a point to point call with a second node 14. The second node 14 only has audio capability and is, for instance, a PSTN phone. The second node 14 is not a part of the ATM network.

The first node 12 begins the formation of the call to the second node 14 by sending signaling information to an SIP server, also part of the ATM network, which identifies to the server that the second node 14 is the destination of the call that the first node 12 is initiating. The server, which already has address information concerning the second node 14, adds the address information to the signaling information received from the first node 12, and transmits the signaling information with the address information of the second node 14 to an audio mixer 20 that is also part of the ATM network.

When the mixer 20 receives the signaling information that has originated from the first node 12, it determines from this information that it is the second node 14 with which the first node 12 wishes to form a connection. The mixer 20 then sends an invitation to the second node 14 through which it is somehow in communication, such as by a T1 line or ethernet but not by way of the ATM network, to identify itself in regard to its features and the form that the data needs to be provided to it so it can understand the data. In response, the second node 14 identifies to the mixer 20 the specific form the data needs to be in so that the second node 14 can understand the data, and also indicates to the mixer 20 it is OK to send data to it so the connection can be formed.

The mixer 20 then sends a signal to the first node 12 that it is ready to form the connection. To the first node 12, the mixer 20, which is part of the ATM network, represents the second node 14 and gives the impression to the first node 12 that the second node 14 is part of the ATM network and is similar to the first node 12. To the second node 14, the mixer 20, which is also part of the network or connectivity that the second node 14 belongs, represents the first node 12 and gives the impression to the second node 14 that the first node 12 is part of the same network or connectivity to which the second node 14 belongs and is similar to the second node 14.

The first node 12 then initiates streaming of the data, which includes audio data, and unicast packets of the data to the mixer 20, as is well known in the art. When the mixer 20 receives the packets, it buffers the data in the packets, as is well known in the art, effectively terminating the connection in regard to the packets from the first node 12 that are destined for the second node 14. The mixer 20, having been informed earlier through the invitation that was sent to the second node 14, of the form the data needs to be in so that the second node 14 can understand it, places the buffered data into the necessary format, and then subject to proper time constraints, sends the properly reformatted data effectively in a new and separate connection from the mixer 20 to the first node 12. In this way, a point to point call is formed, although it really comprises two distinct connections, and neither the first node 12 nor the second node 14 realize that two connections are utilized to create the desired point to point call between the first node 12 in the second node 14. Similarly, when data is sent from the second node 14 back to the first node 12, the process is repeated, although in reverse so that after the data from the second node 14 is received by the mixer 20, the mixer 20 reformats the data into a form that the first node 12 can understand and unicasts the data from the second node 14, that has been buffered in the mixer 20, to the first node 12. If IP instead of ATM is used, then the mixer 20 sends unicast IP packets to the first node 12, as is well known in the art.

A scenario involving conferencing, otherwise known as a point to multi point connection, will now be described using the present invention. Continuing the discussion involving a point to point connection from above, the first node 12 desires to join in the connection to form a conference, a third node 18 that is part of the ATM network and has essentially the same characteristics as the first node 12. The first node 12 sends a signaling invitation to a host node 22 that will host the conference. The host node 22 can be the first node 12 or it can be a distinct node. The first node 12 communicates with the host node 22 through the server to form a conference and join the third node 18 into the conference. The host node 22 invites and then forms a connection for signaling purposes with the mixer 20 and causes the original signaling connection between the first node 12 and the mixer 20 to be terminated. The host node 22 also invites and forms a connection with the third node 18 in response to the request from the first node 12 for the third node 18 to be joined into the connection. In each case that a node which is part of the ATM network is to be joined into the connection, signaling goes through the server and is properly routed, as is well known in the art. The host node 22 acts as a typical host node for a conferencing connection in the ATM network. The mixer 20 represents any nodes that are not part of the ATM network, but that are to be part of the overall conferencing connection.

In regard to any of the nodes on the ATM network, the mixer 20 makes any nodes that are part of the connection but not part of the ATM network appear as though they are just like the other nodes on the ATM network. Through the signaling connections, that are formed between the host and the mixer 20, and the mixer 20 and the second node 14 (as represented by the mixer 20), the required information from all the nodes of the connection is provided to each of the nodes so that they can understand and communicate with all the other nodes of the connection. In fact, the host node 22 informs all the other nodes, not only the information of the characteristics of the other nodes, but also returns the information to the nodes that they had originally provided to the host node 22 so that essentially each node gets its own information back. Once this information is distributed, the streaming information is carried out as would normally be the case in any typical conferencing situation. In an ATM network scenario, the first node 12 and the third node 18 would ATM multicast using PMP tree the information in packets to each other and to the mixer 20. In an IP environment, the first node 12 and the third node 18 would IP multicast packets to all nodes (the mixer 20 being a node for this purpose) in the network, and only those nodes which are part of the connection would understand and utilize the specific packet information that was part of the connection.

The mixer 20 receives the packets from the first node 12 and the third node 18 and buffers them, as described above. The packets from the different nodes that are received by the mixer 20 are reformatted as they are received and mixed or added together according to standard algorithms well known to one skilled in the art. At a predetermined time, as is well known in the art, the reformatted data by the mixer 20 is then transmitted to the second node 14. In the same way, but only in reverse, the data from the second node 14 is received by the mixer 20 and buffered. It is then multicast out in a reformatted form to the first node 12 and the third node 18.

When a fourth node, that only has audio capability, like the second node 14, and which is not part of the ATM network, is joined into the conference, the host node 22 forms a second signaling connection with the mixer 20. The mixer 20 in turn forms a distinct connection with the fourth node separate from the connection the mixer 20 has formed with the second node 14. The mixer 20 maintains a list of sessions that it is supporting. In the session involving the subject conference, it identifies two cross connects through the mixer 20. The first cross connect is through the signaling connection from the host node 22 to the second node 14, and the second cross connect is from the host node 22 to the fourth node. In this way, the first and third nodes 12, 18, as well as the host node 22, believes that there are two separate nodes, representing the second node 14 and the fourth node, to which they are communicating. In fact, the mixer 20 represents both the second node 14 and the fourth node and separately multicasts data from each of them to maintain this illusion, as well as the illusion the second node 14 and the fourth node are like the first node 12 and the third node 18, to the first node 12 and the third node 18.

The ViPr system is a highly advanced videoconferencing system providing 'Virtual Presence' conferencing quality that far exceeds the capabilities of any legacy videoconferencing systems on the market today. The ViPr system relies on point-to-multipoint SVCs (PMP-SVC) and IP multicast to establish point-to-multipoint audio/video media streams among conference participants. While users participating in a ViPr conference enjoy an unprecedented audio and video quality conference, there is a need to enable other non-ViPr users to join a ViPr conference. The system 10 enables a unicast voice-only telephone call (i.e. PSTN, Mobile phones and SIP phones) to be added to a multi-party ViPr conference.

The current ViPr system provides support for telephony systems through SIP-based analog and digital telephony gateways. This functionality enables ViPr users to make/receive point-to-point calls to/from telephone users. However, they do not allow a ViPr user to add a telephone call to a ViPr conference. This is due to the unicast nature of telephone calls and the inability of the telephony gateways to convert them to PMP/multicast streams. The ViPr UAM will enhance the ViPr system's support for telephony by enabling ViPr users to add unicast telephone calls to ViPr conferences.

In order to support this functionality, the ViPr UAM adds seamless conferencing functionality between the ViPr terminals and telephone users (i.e. PSTN, Mobile phones and SIP phones) by converting an upstream unicast telephone audio stream to point-to-multipoint audio streams (i.e. PMP-SVC or IP Multicast) and mixing/converting downstream PMP/multicast ViPr audio streams to unicast telephone audio streams as well as performing downstream audio transcoding of ViPr audio from the wideband 16 bit/16 KHz PCM encoding to G.711 or G.722.

An additional functionality provided by the UAM is that of an Intermedia gateway that converts IP/UDP audio streams to ATM SVC audio streams and vice-versa. This functionality enables the interoperability between ViPr systems deployed in ATM environments and SIP-based Voice-over-IP (VoIP) telephony gateways on Ethernet networks.

The UAM allows one or more ViPr phones to work with one or more phone gateways.

The UAM will support ViPr Conference calls with unicast audio devices present in following configurations:

Type 1: Support one conference call with only one audio unicast device present as a participant.

Type 2: Support multiple conference calls. Each conference call could potentially have multiple audio Unicast devices present as a participant.

Type 3: Support multiple conference calls with each conference call having exactly one audio unicast device present as a participant.

Preferably, 20 participants (unicast devices plus ViPr phones) can be serviced by a single Unicast Manager application.

Figure 1:
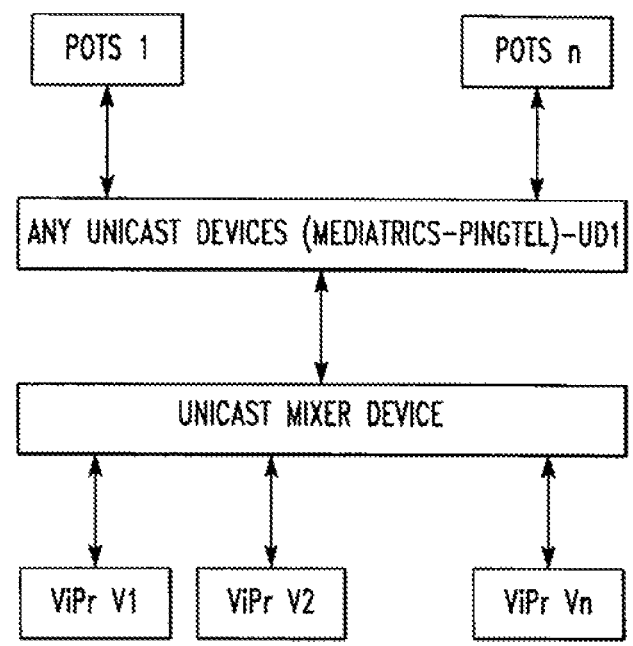
FIG. 1 is a schematic representation of an audio mixer of the present invention.

The unicast device will be used in the configuration shown in FIG. 1.

As shown in FIG. 1, all calls to and from a unicast device to a ViPr are always sent to the UAM. The UAM implements a B2B SIP UA to connect the unicast device to a ViPr.

EXAMPLE

User A at POTS1 calls user B at ViPr V1. The following sequence of events takes place:

1. UD1 (Mediatrics or whatever unicast device) receives the request from User_A to connect to User_B.
2. UD1 sends an INVITE to UAM. The To field or the Display Name in the INVITE identifies the call is for User_B.
3. UAM receives INVITE as incoming call C1.
4. UAM extracts the sip address of User_B from the INVITE on C1 and initiates a call C2 to this user by sending out an INVITE to V1.
5. UAM also cross connects C1 to C2.
6. V1 sees an incoming INVITE from UAM, which is identified by the SDP as a ViPr class device. Thus software on V1 knows that the peer software is capable of supporting all the functionality expected of a ViPr device including Replaces/Refers etc.
7. Say User_B at V1 replies back to INVITE with OK.
8. The UAM will mark the connection C2 as up. It then sends OK on C1.

Media Streams in this Example

The media streams between V1 and UD1 are sent in either of following ways:

11. The media is sent directly from V1 to UD1. This can be done by UAM writing the right SDP. Thus while sending INVITE to V1 it puts the IP address, port of UD1 for receive. And while sending OK to UD1 it puts the IP address, port of V1 as receive address.
12. The media is relayed by UAM. In this case, UAM relays data from V1 to UD1 and vice-a-versa. It is easy to see that if UAM and ViPr communicate are connected via an ATM cloud, then an SVC between V1 and UAM could be set up. Thus, the UAM acts as an ATM to Ethernet gateway for media traffic.

Extending the example 1 further, User_A decides to join User_B at V2 into the conference. The following events happen:

1. The Sip connection between UAM and V1 is replaced by A conference call C3 with V1, V2 and UAM as participants. Thus, the B2B UA is now cross connecting a conference call (C3) with a unicast call (C1).
2. UAM always relays traffic between C3 and C4. Option 11 above. It mixes the traffic from V1 and V2 and relays it to UD1. It also multicasts traffic from UD1 to V1 and V2.

The functionality performed by the UAM can be broken into following components:

SIP B2B UA Unit [SBU]. This unit performs the sip signaling required to implement the B2B SIP UA.

Media Cross Connect and Mixer (MCMU).

Figure 2:
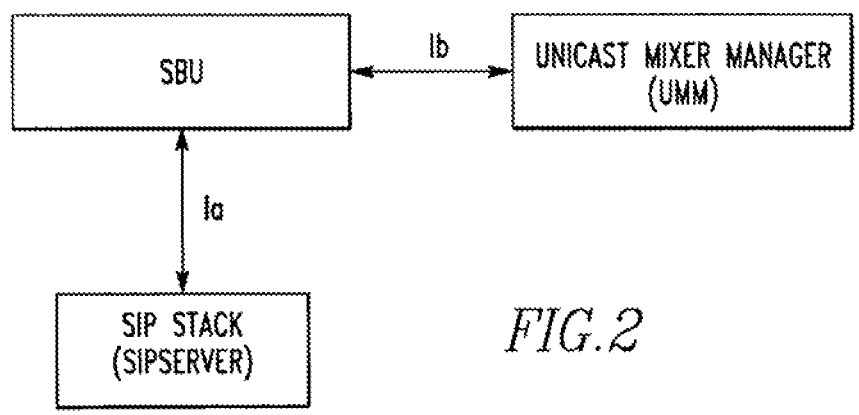
FIG. 2 is a block diagram of the architecture for the mixer.

The UAM functionality will be decided across three processes: SBU, Unicast Mixer Manager and Sip stack, as shown in FIG. 2.

The SipServer process will implement the SIP functionality and would provide the SBU with an abstracted signaling API (Interface Ia). Interface Ia also stays unchanged.

The SBU implements the call control and glue logic for implementing the B2B UA. This unit derives from Callmanager/Vupper code base. The SBU is responsible for setting up the right mixer streams too. For this purpose, SBU interfaces with the UMM process through RPC.

UMM implements the functionality for cross-connecting media streams as well as implementing the audio mixing functionality.

The SBU implements the call control and glue logic for implementing the B2B UA. The SBU is responsible for setting up the right mixer streams too. For this purpose, SBU interfaces with the UMM process through RPC.

Session

Class MediaSession

```
{
    int         SelfID      // Self ID
    CVString    GUID        // Conference Call ID
    CVList      XIDList;    // List of cross connects
    GUID
}
```

SIPB2BCrossConnect
Class SIPB2BCrossConnect

```
{
    int     SelfID          // Self ID
    int     SessionID       // Of session of which it is a member
    Int     ViPrLegID       // SipCallLeg connected to ViPr
    Int     UDLegID         // Leg connected to unicast device.
}
```

SIPB2BCallLeg
Class SIPB2BCrossConnect

```
{
    int         SelfID      // Self ID - returned by callmanager
    int         XID         // ID of Cross Connect who owns this
leg
    SipCallLeg  ViPrLeg     // Leg connected to ViPr
    SipCallLeg  UDLeg       // Leg connected to unicast device.
}
```

Figure 3:
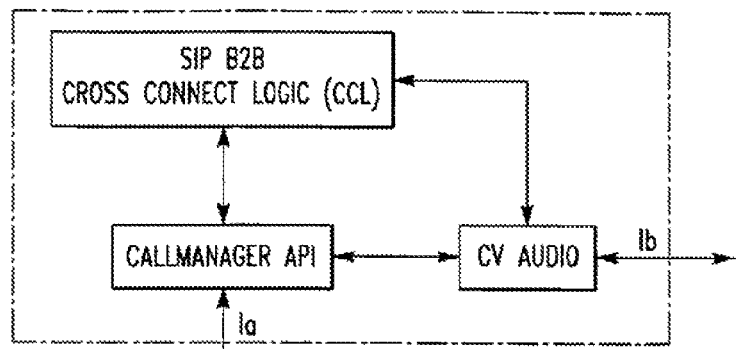
FIG. 3 is a block diagram of an SBU.

The SBU unit is internally structured as follows:

As can be seen from FIG. 3, the design for SBU reuses and extend the SIP/Media Stream interface offered by the CallManager to implement the signaling call control logic for UAM.

The following text presents the flow of control when the user A initiates a call to User_B.

In the following SipServer refers to SipServer at UAM, SBU refers to SBU at UAM and UMM refers to UMM at UAM.

To clarify the example further, assume the following:
The entire network is Ethernet network
IP address of V1 is 172.19.64.101
IP address of V2 I 172.19.64.101
IP address of interface of UAM which is connected to V1/V2 cloud is 172.19.64.51, IP interface of UAM connected to UD1 cloud is 169.144.50.100
IP address of UD1 is 169.144.50.48
Address is represented as <IpAddress, port> tuple
All the addresses and ports in the example are illustrative, they are not required to be fixed but are rather allocated by OS.
In the following example, all the SIP events received by SBU (at UAM) are actually received by SipServer and than passed to SBU. However, the Sipserver receiving the event and passing it to SBU is not shown for brevity.

| Flow of control for a P2P call between UD1 and V1 | | |
|---|---|---|
| # | Loc | Action |
| 1 | UD1 | INVITE sent from UD1 to SD1. This invite contains the Address <169.144.50.48, 50000> for receiving stream from UD1 for this call. |
| 2 | SBU | SBU gets an incoming call C1. SBU examines the call and sees it is from a Unicast device. It then performs the following actions. Extracts the address (User_B) of final destination UD1 is trying to reach. It allocates address <172.19.64.51, 40002> for receiving media stream from V1. It initiates an outgoing call (C2) to User_B by asking sipserver to send an INVITE to User_B. This invite contains the address <172.19.64.51, 40002>. It also allocates a sip cross connect (XID = 1) and binds C1 and C2 to XID = 1. At this point sip cross connect XID = 1 C1 and C2 as a back-to-back calls. It also stores XID = 1 in the calls C1 and C2. This is to enable retrieving XID from Call ID. |
| 3 | V1 | V1 receives an incoming INVITE and accepts the call by sending an OK to UAM. The OK contains address <172.19.64.101, 10002> for receiving traffic from UAM. |
| 4 | SBU | SBU Gets OK (call accept event) on C2. It the performs following steps: Receives the cross connect (XID = 1) of which C2 is a member. Allocates an address for use of C2. <169.144.50.100, 40001> Instructs SipServer to send OK On call C2. This OK contains address <1169.144.50.100, 40001> for receiving media from UD1. Allocates a Session with ID (say, SID = 100). This session ID is stored in Sip Cross connect XID = 1. The SipCross connect with XID = 1 is also added to the list of Cross-connects part of this session. At this time, there is just one SIP cross connect in the list. SBU then allocates a media channel to be used for receiving and sending data from UD1, say with CHID = 0. SBU allocates a media channel to be used for sending and receiving data from V1, say CHID-1. SBU then informs UMM to setup channels for sending and receiving data from V1 and UD1 as follows: SBU informs UMM that channel = 0 should be used to send/receive data to/from UD1. This is done by asking UMM to associate channel = 0 with send address <169.144.50.48, 50000> and Receive address <169.144.50.100, 40001>. SBU informs UMM that channel = 1 should be used to send/receive data to/from V1. This is done by asking UMM to associate channel = 0 with send address <172.19.64.101, 10001> and Receive address <172.19.64.51, 40002>. SBU then instructs the UMM to construct a media cross connect by informing UMM that Channels CID = 0 and CID = 1 are part of same session SID = 100. It should be noted that UMM is not informed (nor does it care) about the SIP calls C1 and C2. |
| 5 | UD1 | Receives an OK from UAM. It knows from OK that for sending audio media to UAM it must use the address <169.144.50.100, 40001>. |

The above table explains what happens for a pass through call. The following is the control flow when this call is converted into a conference call. In this case, say User_B conferences User_C at V2 into the call.

Further assume the following:
IP address of V2 is 171.19.64.102

| Initiating a conference with a user on unicast device. | | |
|---|---|---|
| # | Loc | Action |
| 6 | V1 | V1 # Sends an INVITE to Conference Host H (at V1) to initiate conference. The INVITE contains the multicast IP address <239.192.64.101, 10002> on which V1 would multicast its audio stream. |
| 7 | H | Host Gets an INVITE to start a conference call. It sends an OK back to V1. H also constructs a globally unique ID for this conference call. (say, GUID = 900). |
| 8 | V1 | Refers UAM into the conference (with Replaces = C2). |
| 9 | H | Sends an INVITE to UAM with following information: GUID = 900 Replaces = C1 Stream information for V1(User_B) <239.192.64.101, 10002> |
| 10 | SBU | On getting Invite for a conference call (C3) SBU performs following: Sees that Replace ID = C2. It thus knows that V1 wants to |

Initiating a conference with a user on unicast device.

| # | Loc | Action |
|---|-----|--------|
|   |     | bring POTS1(UD1) into Conference GUID = 100.<br>It Retrieves the SIP Cross-connect XID = 1 from C2.<br>It retrieves the Session ID from the SipCross Connect, SID = 100. And sets the GUID member of the Session to GUID = 900.<br>It Sets the GUID in Sip Cross-connect XID = 1 to GUID = 100.<br>It releases the sip connection C2 by informing SipServer to send a Bye on C2.<br>Removes C2 from SIP Cross-connect XID = 1 and replaces it with C3. It also sets the SIP cross connect ID in C3 to XID = 1.<br>It also sets the XID member within C3 to point to XID = 1.<br>It allocates address <239.192.64.51, 40003> for transmitting data on behalf of UD1.<br>It informs UMM to delete channel CID = 1. Thus UMM will now stop transmitting media to address <172.19.64.101, 10001> and stop receiving media at address <172.19.64.51, 40002>.<br>It sends an OK back to the Host. The OK contains information that everyone on the conference should send receive media streams from POTS1(UD1) on address <239.192.64.51, 40003>.<br>SBU then instructs UMM to set up the right audio streams for conference (GUID = 900) with V1 and UD1 present as participants as follows:<br>SBU informs that channel = 2 should be used to send/receive data to/from V1. Thus channel = 2 is associated with send address <239.192.64.51, 40003> and Receive address <239.192.64.101, 10002>.<br>SBU informs UMM to associate channel = 2 with Session SID = 100.<br>SBU informs the UMM to set the retransmit address field for channel = 0 <239.192.64.51, 40003>.<br>It should again be noted that UMM is not aware of either the presence of SIP calls C1 and C3, nor does not it know that there is a conference call with GUID = 900. Internally, UMM does not really look at the send address in channel = 2 to relay data from UD1 to conference. Rather, it looks at the retransmit address in the Channel ID = 2. |
| 11 | Host | Gets OK from UAMD. It sends a RE_INVITE to V1 indicating the presence of stream from User_A at <239.192.64.51, 40003>. |
| 12 | V1 | Refers User_C at V2 into the conference. |
| 13 | H | Sends an INVITE to V2 indicating presence of streams from User_A at and User_B. |
| 14 | V2 | V2 sends an OK. The OK contains the multicast IP address <239.192.64.102, 20001> on which V1 would multicast its audio stream. At this point, User_C can start listening to audio from User_A and User_B by registering to appropriate multicast addresses. |
| 15 | H | Sends a RE_INVITE to V1 and UAMD indicating presence of a new participant User_C sending audio at <239.192.64.102, 20001>. |
| 16 | V1 | Gets a RE_INVITE and sees that party User_C is now on the call. It sends an OK back to H. |
| 17 | SBU | Gets a RE_INVITE and sees that a new party User_C is also on conference call with GUID = 900. It then performs following steps:<br>Sends an OK back to the Host through sip server.<br>Allocates a media channel CID = 3 for receiving traffic from User_C.<br>Informs UMM to join media from User_C into the conference call identified by GUID = 900 as follows:<br>SBU informs UMM that channel = 3 should be used to send/receive data to/from (User_C) at V2.<br>Thus, channel = 3 is associated with send address <239.192.64.51, 40003> and Receive address <239.192.64.102, 20001>.<br>SBU informs UMM to associate channel = 2 with Session SID = 100.<br>It should be noted again that all UMM knows is that there are three channels (CID = 0, 2 and 3) which all belong to the same session. UMM knows that CID = 2 and 3 are streams from ViPr phone and CID = 0 are from a unicast device.<br>Thus, UMM reads multicast data from channels CID = 2 (<239.192.64.102, 20001> and CID = 3 (<239.192.64.101, 10002>) mixes them and sends it on channel = 0<169.144.50.48, 50000>. Also the data read from channel CID = 0, is retransmitted on retransmit address associated with CID = 0 <239.192.64.51, 40003>.<br>The details of how UMM performs this appropriate mixing are in a different section. |
| 18 | H | Gets the OK for re-invites sent in step 16. The conference call is now up. |

To add another ViPr user to the conference, steps 12 through 18 are repeated. Consider the steps that are required to another Unicast Device user say User_D on POTS2.

Assume the following:
User_C on ViPr V2 decides to conference in User_D on POTS2 into the conference.

Flow of control for adding second unicast user to a conference.

| # | Loc | Action |
|---|-----|--------|
| 19 | V2 | Refers User_D at POTS2 into the conference. |
| 20 | H | Sends an INVITE to UAM with following information:<br>User_A, User_B and User_C call along with the addresses on which they are generating media streams.<br>GUID = 900 |
| 21 | SBU | Gets Request for an incoming conference call (C4) with GUID = 900<br>To address = Address of User_D<br>It then performs following tasks:<br>It allocates a SIP Cross-connect with ID, XID = 2.<br>It adds C4 to the sip cross connect XID = 2. It also sets the XID member within C4 to XID = 2.<br>It searches all the Session structures to see if there is a session with GUID = 900. It finds that a session with ID = 100 is associated with this conference call.<br>It then adds SIP cross connect with XID = 2, to the list of cross connects attached to Session SID = 100. At this point there are two SIP cross connects (XID = 1, and XID = 2) which are part of the SIP session SID = 100.<br>It also stores information within sip cross connect XID = 2, to indicate it is associated with Session = 100.<br>It allocates an address <169.144.50.51, 40011> for receiving traffic from User_D.<br>It allocates a media channel CHID = 4 for receiving traffic from User_D <239.192.64.51, 40012>.<br>It initiates a connection C5 by sending an INVITE to UD1 for User_D. The INVITE contains the information that UD1 should send audio media streams for this call at <169.144.50.51, 40004>.<br>It adds C5 to the sip cross connect of XID = 2. Thus XID = 2 is now connecting CID = 4 and CID = 5 as back to back SIP calls.<br>It also sets XID member of C5 to XID = 2. |
| 22 | UD1 | Receives INVITE from UAM and sends back an OK to UAM. It indicates in the OK that the address on which it should be sent data for call C5 is <169.144.50.48, 50002>. |
| 23 | SBU | Receives OK from UAM for C5. It then performs following steps:<br>It retrieves the sip cross connect of which C5 is a member, XID = 2.<br>It retrieves the session from sip cross connect, SID = 100.<br>It then allocates an address <239.192.64.51, 40012> to relay data received on User_D into the conference, GUID = 900.<br>It then sends an OK to Host indicating that User_D would be generating traffic on <239.192.64.51, 40012>.<br>It then allocates channels for receiving traffic User_A (CHID = 5), User_B (CHID = 6) and (CHID = 7).<br>It then asks UMM to add User_D into the conference as follows: |

-continued

Flow of control for adding second unicast user to a conference.

| # | Loc | Action |
|---|-----|--------|
|   |     | SBU informs UMM that channel = 4 should be used to send/receive data to/from User_D. Thus channel = 3 is associated with send address <169.144.50.51, 40011> and Receive address <169.144.50.48, 50002>. SBU also informs UMM to set the retransmit address of CHID = 4 to <239.192.64.51, 40012>. SBU informs UMM that Channel = 5, 6 and 7 should be used to exchange traffic with User_A, User_B and User_C. The following information is provided for these channels. CHID = 5 [Rx = <239.192.64.102, 20001>, Tx = <239.192.64.51, 40012> CHID = 6 [Rx = <239.192.64.101, 10001>, Tx = <239.192.64.51, 40012> CHID = 7 [Rx = <<239.192.64.51, 40012>, Tx = <239.192.64.51, 40012> SBU informs UMM to associate channel = 4, 5, 6, 7 with Session SID = 100 {Please note that CHID = 5 the information for receiving packets from User_A is same as one present in CHID = 2 and would seem like a waste and troublesome but this has in fact has a desirable effect of not requiring any change in call manager and also eliminates needs for book keeping in SBU. Same holds for CHID = 3 and CHID = 6. The UMM would never receive anything on CHID = 7 because multicasts are not received by the host which transmitted them.} In the UMM there are two channels CHID = 2 and 5 which are referring to the same receive multicast address, now since both the channels belong to the same session = 100, it is not a problem. Since the UMM will not read packets from duplicate channels. However, if Channel = 2 is deleted then UMM will go and read packets from CHID = 5. |
| 24 | H | Host receives the OK on C5 (from UAM) with information added to receive audio streams from User_D. It Sends a Re-Invite to User_A, User_B and User_C indicating presence of a new stream from User_D. |
| 25 | SBU | Gets a REINVITE on C3 indicating presence of another user User_D transmitting on multicast address <239.192.64.51, 40012> It then performs following tasks: Sends an OK back to host on C3 through sip server. It retrieves the sip cross connect of which C3 is a member, XID = 1. It retrieves the session SID = 100 from sip cross connect XID = 1 It allocates channel CHID = 8 to receive audio from the User_D. It then instructs UMM to receive and mix traffic from User_D into the Session SID = 100. as follows: SBU informs UMM that channel = 8 should be used to send/receive data to/from User_D. Thus channel = 8 is associated with send address and Receive address <239.192.64.51, 40012>. SBU also sets the session ID for channel CHID = 8 to SID = 100. [NOTE: Since UAMD programs the IP sockets to never receive packets it has transmitted on a multicast address, no traffic would be received on CHID = 8. Which is exactly what is desired.]. |
| 26 | V1 and V2 | Sends an OK to re-invite sent by Host |
| 27 | H | Receives OK from all the participants, the conference call now has 4 parties on call. Two of which are unicast devices. |

UMM implements the functionality for cross-connecting media streams as well as implementing the audio mixing functionality.

Deployment Scenario 1:

Referring to FIG. 4, this scenario covers two cases:

A ViPr user in a multi-party ViPr audio/video conference adding a unicast audio-only telephone user to the conference:

In this case, ViPr users in multi-party ViPr conference decide to add a unicast telephone user to the conference. As a result, one of the participants initiates a call to the destination telephone number. The ViPr SIP server redirects the call to the ViPr UAM. The ViPr UAM terminates the ViPr audio-only call and establishes a back-to-back call to the destination telephone via the telephony gateway.

Once the call is established, the ViPr UAM converts the unicast G.711/G.722 audio stream received from the telephone into a PMP/multicast stream and forwards it to the ViPr terminals without any transcoding. On the other hand, the ViPr UAM performs transcoding and mixing of the wideband 16 bit/16 KHz PCM ViPr audio streams received from the various ViPr terminals into one G.711 or G.722 unicast audio stream and forwards it to the telephone destination.

A ViPr user in point-to-point audio-only conference with a telephone user adding another ViPr user to the conference:

In this case, a ViPr user (V1) in point-to-point audio-only call with a telephone user (T) decides to add another ViPr user (V2) to the conference. As a result, the ViPr user V1 initiates an audio/video call to the destination V1Pr user V2. The ViPr system tears down the established point-to-point call between V1 and the ViPr UAM and re-establishes a PMP/multicast call between V1, V2 and the ViPr UAM.

The ViPr UAM terminates the new ViPr audio/video call and bridges it to the already established back-to-back telephone call. Throughout this process, the telephone call remains active and the switching is transparent to the telephone user.

Once the call is established, the ViPr UAM converts the unicast G.711/G.722 audio stream received from the telephone into a PMP/multicast stream and forwards it to the ViPr terminals without any transcoding. On the other hand, the ViPr UAM performs transcoding and mixing of the wideband 16 bit/16 KHz PCM ViPr audio streams received from the various ViPr terminals into one G.711 or G.722 unicast audio stream and forwards it to the telephone destination.

ViPr uses Session Initiation Protocol (SIP) as a means of establishing, modifying and clearing multi-stream multi-media sessions. The UAM will add conferencing capabilities between the ViPr terminals and telephone users (i.e. PSTN, Mobile phones and SIP phones) by converting upstream unicast voice-only telephone streams into point-to-multipoint streams (i.e. PMP-SVC or IP Multicast) and converting downstream ViPr multicast/PMP audio streams to unicast telephone voice-only streams as well as performing downstream audio transcoding of ViPr audio from wideband 16 bit/16 KHz PCM encoding to G.711 or G.722.

Figure 5:
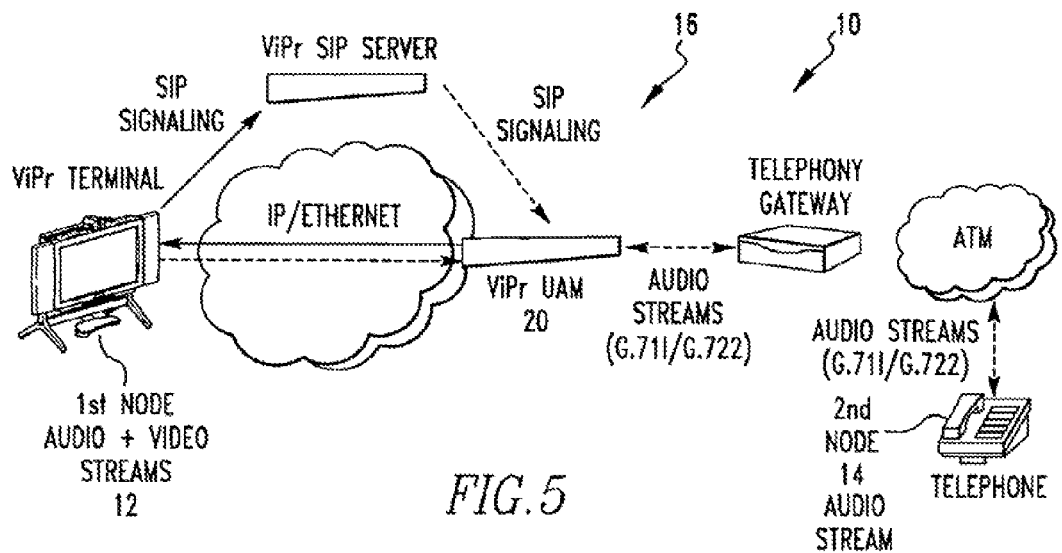
FIG. 5 is a schematic representation of a videophone UAM in a two-way telephone call.

Deployment Scenario 2:

Referring to FIG. 5, this scenario covers two cases:

A telephone user calling a ViPr user:

In this case, a telephone user initiates a call (audio only) to a ViPr user. The telephony gateway redirects the call to the ViPr UAM. The ViPr UAM terminates the telephone call and establishes a back-to-back ViPr audio-only call to the destination ViPr terminal.

Once the call is established, the ViPr UAM forwards the G.711/G.722 audio stream received from the telephone to the ViPr terminal without any transcoding. On the other hand, the ViPr UAM performs transcoding of the ViPr audio stream from wideband 16 bit/16 KHz PCM to G.711 or G.722 and forwards it to the telephone destination.

A ViPr user calling a telephone user:

In this case, a ViPr user initiates a call to a telephone user. The ViPr SIP server redirects the call to the ViPr UAM. The ViPr UAM terminates the ViPr audio-only call and establishes a back-to-back PSTN call to the destination telephone via the telephony gateway. Transcoding is done in the same way as described in the previous paragraph.

Figure 6:
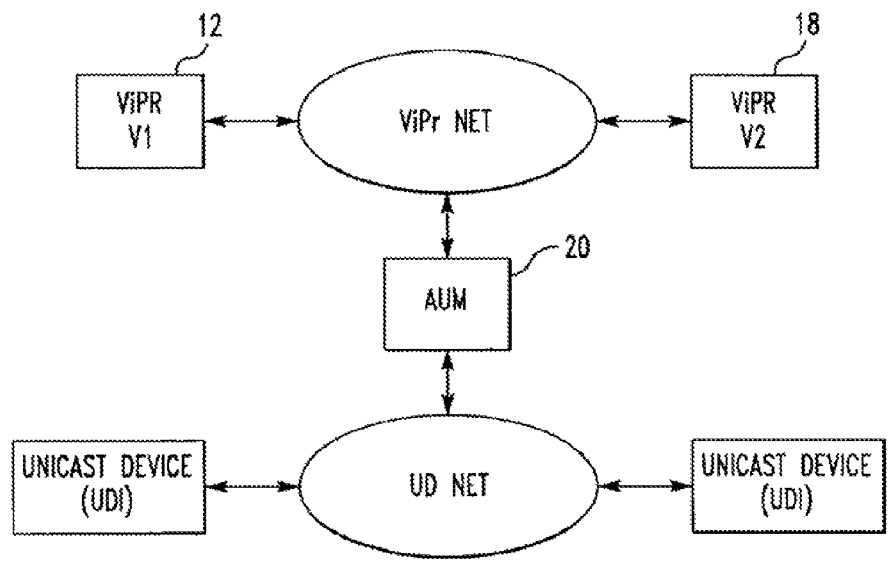
FIG. 6 is a schematic representation of a network for a mixer.

FIG. 6 gives a typical usage context for UAM. The features provided by the UAM are the following.

Feature 1

Say that ViPr V1 and V2 are in a point-to-point call and they wish to engage Unicast Device UD1 in a conference call. Put in other words the intent is to form a conference call with UD1, V1 and V2 in conference. Say user at V1 requests that user at UD1 be joined into the conference call with V1 and V2 as other parties. This request is forwarded by one of the SIP servers to the UAM.

UAM then performs the following tasks:
  It joins the conference call on behalf of UD1. Call this conference call C1.
  It also makes a point-to-point call with the Unicast Device. Call this conference call C2.
  It relays audio data received on C2 to C1.
  It accepts the audio data from V1 and V2 parties in call C2, mixes and forwards this data to UD.

Feature 2

Consider the case where vipr-net in the figure above is ATM and UD-net is an IP network. Also, suppose that it is desired that to the extent possible only SVCs be used over the ATM network for audio rather than LANE/CLIP. This could be for security concerns or for performance issues.

In this case, if a ViPr V1 on vipr-net wishes to engage a unicast device (UD1) in an audio conversation, than UAM is used to provide functionality to use SVC in the ATM network and IP in the IP network.

To do this all call from V1 to UD1 is broken into two calls from V1 to UAMD and from UAMD to V2.

The configuration required for features supported by UAM can be broken into following categories:
  Configuration for ViPr to UD calls.
  Configuration for UD to ViPr calls.
  General configuration General Configuration The B2BUA SIP UA is made to run on any desired port (other than 5060). This is done by modifying the vipr.ini file to include following parameter:
SIP Port=7070[any valid port number]
Configuration for ViPr to UD Calls For a typical ViPr call when a user dials a "number" its "call-request" is sent to SIP Server which than forwards it to the appropriate destinations. However, this case is different. In this case, when a user says I wish to talk to unicast device (UD1) the SIP Server forwards the request to UAM. In addition, it also puts information in the request to identify that this call should be forwarded to UD1. Thus, the SIP Server is programmed to route calls made to the SIP-URIs serviced by the UAM devices to the appropriate UAMD Server.

It is also possible to specify a default unicast device SIP address to which to forward all calls received by the UAM. This default address can be specified in vipr.ini file by adding following lines:
UD_SERVER_ADDRESS=169.144.50.48
X_FORWARD_AVAILABLE=0

It should be noted that when a call is made from a unicast device to a ViPr, the call has to be delivered to the UAM. To do this, appropriate configuration is performed at unicast device, please refer to unicast device specific documentation for this.
Configuration for UD to ViPr Call The calls originating at the UD for a ViPr are routed to the UAM. One way to achieve this is by programming the UD to direct/forward all calls to UAM. Also, the eventual destination of the calls (say V1) is specified in the call request to UAM. Typically, this address will be the To field in the SIP message. These configurations are performed at the UD or the SIP Server.

In addition, when UAM receives a call request from a UD, it forwards it to a gateway Marshall server for performing sanity checks on the called party. This gateway address can be specified in the vipr.ini file
GatewayMarshallServer=sip.eng.fore.com:5065

| List of Acronyms | |
|---|---|
| ATM | Asynchronous Transfer Mode |
| ISDN | Integrated Services Digital Network |
| IP | Internet Protocol |
| LAN | Local Area Network |
| MC | Multicast (IP) |
| MCMU | Media Cross Connect and Mixer |
| MCU | Media Conferencing Unit |
| PBX | Private Branch Exchange (private telephone switchboard) |
| PCM | Pulse-Code Modulation |
| PMP | Point-to-Multipoint (ATM) |
| POTS | "Plain Old Telephone System" |
| PRI | Primary Rate Interface (ISDN) |
| PSTN | Public Switched Telephone Network |
| SBU | SIP back-to-back user agent |
| SIP | Session Initiation Protocol |
| SVC | Switched Virtual Circuit (ATM) |
| UAM | Unicast Audio Mixer |
| ViPr ™ | Virtual Presence System |
| WAN | Wide Area Network |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for forming a telecommunications call comprising the steps of:
  calling from a multicast Internet Protocol (IP) or point-to-multipoint (PMP) ATM terminal, having audio and video streams, in a first network to a unicast terminal, having only an audio stream and only having audio capability, in a second network; and
  forming a call between the multicast IP or PMP ATM terminal and the unicast terminal using a mixer so the multicast IP or PMP ATM terminal and the unicast terminal communicate their audio streams with each other, wherein the forming step implemented by the mixer includes the steps of:
    converting an upstream telephone audio stream from the unicast terminal to a PMP audio stream for the multicast IP or PMP ATM terminal; and
    mixing/converting a downstream PMP/multicast audio stream from the multicast IP or PMP ATM terminal to a unicast telephone audio stream for the unicast terminal; and
  wherein the mixer has a back-to-back user agent for presenting one interface to the multicast IP or PMP ATM terminal and presenting another interface to the unicast terminal, wherein the one interface enables the multicast IP or PMP ATM terminal to communicate with the mixer as if the mixer was another multicast IP or PMP ATM terminal without video, and wherein the another interface enables the unicast terminal to communicate with the mixer as if the mixer was another unicast terminal.

2. The method as described in claim 1, wherein the mixer enables the multicast IP or PMP ATM terminal which is taking part in a conference call with at least one other multicast IP or PMP ATM terminal to add the unicast terminal to the conference call.

3. A telecommunications system comprising:
- a multicast Internet Protocol (IP) or point-to-multipoint (PMP) ATM terminal, having audio and video streams;
- a unicast terminal, having only an audio stream and only having audio capability; and
- a mixer for forming a call between the multicast IP or PMP ATM terminal and the unicast terminal so the multicast IP or PMP ATM terminal and the unicast terminal communicate their audio streams with each other, wherein the mixer is configured to convert an upstream telephone audio stream from the unicast terminal to a PMP audio stream for the multicast IP or PMP ATM terminal, and wherein the mixer is configured to mix/convert a downstream PMP/multicast audio stream from the multicast IP or PMP ATM terminal to a unicast telephone audio stream for the unicast terminal; and
- wherein the mixer further comprises a back-to-back user agent configured to present one interface to the multicast IP or PMP ATM terminal and present another interface to the unicast terminal, wherein the one interface enables the multicast IP or PMP ATM terminal to communicate with the mixer as if the mixer was another multicast IP or PMP ATM terminal without video, and wherein the another interface enables the unicast terminal to communicate with the mixer as if the mixer was another unicast terminal.

4. The telecommunications system as described in claim 3, wherein the mixer enables the multicast IP or PMP ATM terminal which is taking part in a conference call with at least one other multicast IP or PMP ATM terminal to add the unicast terminal to the conference call.

5. An audio mixer for use in a telecommunications system, the audio mixer configured to form a telecommunications call between a multicast Internet Protocol (IP) or point-to-multipoint (PMP) ATM terminal, having audio and video streams, and a unicast terminal, having only an audio stream and only having audio capability by (1) converting an upstream telephone audio stream from the unicast terminal to a PMP audio stream for the multicast IP or PMP ATM terminal, and (2) mixing/converting a downstream PMP/multicast audio stream from the multicast IP or PMP ATM terminal to a unicast telephone audio stream for the unicast terminal, and wherein the audio mixer further comprises a back-to-back user agent configured to present one interface to the multicast IP or PMP ATM terminal and present another interface to the unicast terminal, wherein the one interface enables the multicast IP or PMP ATM terminal to communicate with the mixer as if the mixer was another multicast IP or PMP ATM terminal without video, and wherein the another interface enables the unicast terminal to communicate with the mixer as if the mixer was another unicast terminal.

6. The audio mixer as described in claim 5, wherein the audio mixer is further configured to enable the multicast IP or PMP ATM terminal which is taking part in a conference call with at least one other multicast IP or PMP ATM terminal to add the unicast terminal to the conference call.

* * * * *